(12) United States Patent
Choi et al.

(10) Patent No.: US 12,061,352 B2
(45) Date of Patent: Aug. 13, 2024

(54) BACKLIGHT UNIT AND HOLOGRAPHIC DISPLAY APPARATUS INCLUDING THE SAME

(71) Applicant: SAMSUNG ELECTRONICS CO., LTD., Suwon-si (KR)

(72) Inventors: Chilsung Choi, Suwon-si (KR); Hoon Song, Yongin-si (KR); Jungkwuen An, Suwon-si (KR); Hongseok Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/693,974

(22) Filed: Mar. 14, 2022

(65) Prior Publication Data
US 2022/0196900 A1 Jun. 23, 2022

Related U.S. Application Data

(62) Division of application No. 16/675,387, filed on Nov. 6, 2019, now Pat. No. 11,307,343.

(30) Foreign Application Priority Data

May 17, 2019 (KR) .................. 10-2019-0058309

(51) Int. Cl.
*G02B 27/00* (2006.01)
*F21V 8/00* (2006.01)
(Continued)

(52) U.S. Cl.
CPC ......... *G02B 6/0026* (2013.01); *G02B 6/0016* (2013.01); *G02B 6/005* (2013.01);
(Continued)

(58) Field of Classification Search
CPC .... G02B 6/0026; G02B 6/0016; G02B 6/005; G02B 6/0068; G02B 6/0076; G02B 30/25;
(Continued)

(56) References Cited

U.S. PATENT DOCUMENTS 9,523,852 B1 12/2016 Brown et al.
2002/0076129 A1 6/2002 Holzapfel et al.
(Continued)

FOREIGN PATENT DOCUMENTS

KR 10-1835058 B1 3/2018
KR 10-2018-0072356 A 6/2018
(Continued)

*Primary Examiner* — Audrey Y Chang
(74) *Attorney, Agent, or Firm* — Sughrue Mion, PLLC

(57) ABSTRACT

A backlight unit may include: a light source providing coherent light; a light guide plate having a light entrance surface on which light from the light source is incident and a light exit surface through which the light is output; a plurality of diffraction gratings (for example, a first input grating, a second input grating, and a third input grating) that are arranged in different regions of the light guide plate to sequentially diffract the light from the light source such that that the beam width of the light may increase as the light propagates in the light guide plate; and a diffraction grating (for example, an output grating) that diffracts and outputs the light having an increased beam width in a direction toward the outside of the light guide plate.

8 Claims, 14 Drawing Sheets

(51) Int. Cl.
*G02B 30/25* (2020.01)
*G03H 1/08* (2006.01)
*G03H 1/22* (2006.01)

(52) U.S. Cl.
CPC .......... *G02B 6/0068* (2013.01); *G02B 6/0076* (2013.01); *G02B 30/25* (2020.01); *G03H 1/0866* (2013.01); *G03H 1/2294* (2013.01)

(58) Field of Classification Search
CPC ............ G02B 27/0172; G02B 27/4277; G03H 1/0866; G03H 1/2294
USPC ..................................................... 359/34, 569
See application file for complete search history.

(56) References Cited

U.S. PATENT DOCUMENTS

| | | |
|---|---|---|
| 2009/0323144 A1 | 12/2009 | Gruhlke et al. |
| 2014/0300966 A1 | 10/2014 | Travers et al. |
| 2017/0248790 A1* | 8/2017 | Cheng ................ G02B 27/0172 |
| 2018/0017801 A1 | 1/2018 | Chang et al. |
| 2018/0149790 A1 | 5/2018 | Kim et al. |
| 2018/0156962 A1 | 6/2018 | Kim et al. |
| 2018/0173057 A1 | 6/2018 | Choi et al. |
| 2018/0203230 A1 | 7/2018 | Vallius et al. |
| 2019/0049739 A1 | 2/2019 | Choi et al. |
| 2019/0064420 A1 | 2/2019 | Lee et al. |
| 2019/0113802 A1 | 4/2019 | Won et al. |
| 2019/0212700 A1 | 7/2019 | An et al. |
| 2020/0150587 A1 | 5/2020 | Choi et al. |
| 2020/0278543 A1* | 9/2020 | Schultz ............... G02B 27/4277 |

FOREIGN PATENT DOCUMENTS

| | | |
|---|---|---|
| KR | 10-2019-0018344 A | 2/2019 |
| KR | 10-2019-0023921 A | 3/2019 |
| KR | 10-2019-0043438 A | 4/2019 |
| KR | 10-2019-0083880 A | 7/2019 |
| KR | 10-2020-0053319 A | 5/2020 |

* cited by examiner

BACKLIGHT UNIT AND HOLOGRAPHIC DISPLAY APPARATUS INCLUDING THE SAME

CROSS-REFERENCE TO RELATED APPLICATION

This application is a Divisional of U.S. application Ser. No. 16/675,387 filed Nov. 6, 2019, which is based on and claims priority under 35 U.S.C. § 119 from Korean Patent Application No. 10-2019-0058309, filed on May 17, 2019, in the Korean Intellectual Property Office, the disclosure of which is incorporated herein in its entirety by reference.

BACKGROUND

1. Field

The disclosure relates to a backlight unit and a holographic display apparatus including the backlight unit.

2. Description of the Related Art

As methods of providing 3D images, glasses methods and non-glasses methods are widely used. Examples of glasses methods include polarized glasses methods and shutter glasses methods, and examples of non-glasses methods include lenticular methods and parallax barrier methods. Such methods use binocular parallax and are limited in increasing the number of viewpoints. In addition, such methods make viewers feel tired due to the difference between the depth the brain perceives and the focus of the eyes.

Recently, holographic display methods, which are 3D image display methods capable of making the depth the brain perceives the same as the focus of the eyes and providing full parallax, have been gradually implemented into practical use. In such a holographic display method, reference light is emitted to a holographic pattern which records interference fringes formed by interference between reference light and object light reflected from an original object, and then images of the original object are reproduced by light diffracted by the holographic pattern. In currently practical holographic display methods, a computer generated hologram (CGH) is provided to a spatial light modulator as an electrical signal rather than obtaining a hologram pattern by directly exposing an original object to light. Then, the spatial light modulator may form a hologram pattern according to the input CGH signal and diffract reference light to generate 3D images.

SUMMARY

Provided is a backlight unit having a small size for application to a holographic display apparatus.

Provided is a holographic display apparatus configured to prevent the formation of interference fringes using a backlight unit.

Additional aspects will be set forth in part in the description which follows and, in part, will be apparent from the description, or may be learned by practice of the presented embodiments of the disclosure.

According to an aspect of the disclosure, there is provided a backlight unit comprising: a light source configured to provide coherent light; a light guide plate comprising a light entrance surface on which the light is incident from the light source and a light exit surface through which the light is output; a first input grating provided on the light guide plate and configured to diffract the light from the light source such that the light diffracted by the first input grating propagates in a first direction while being totally reflected in the light guide plate; a second input grating provided on the light guide plate and configured to diffract the light that is diffracted by the first input grating and is propagating in the first direction such that the light diffracted by the second input grating propagates in a second direction different from the first direction while being totally reflected in the light guide plate, wherein beam width of the light propagating in the second direction increases as the light propagates in the light guide in the second direction; a third input grating provided on the light guide plate and configured to diffract the light diffracted by the second input grating such that the light diffracted by the third input grating propagates in a third direction different from the second direction, wherein beam width of the light propagating in the third direction increases as the light propagates in the light guide in the third direction; and an output grating provided on the light guide plate and configured to diffract the light diffracted by the third input grating such that the light is output in a fourth direction toward an outside of the light guide plate.

The first input grating, the second input grating, the third input grating, and the output grating may be provided on the light exit surface of the light guide plate.

An area of the second input grating may be larger than an area of the first input grating.

The second input grating may be configured to collimate the light diffracted by the first input grating.

A length of the third input grating in the second direction may be larger than a length of the second input grating in the second direction.

A length of the output grating in the third direction may be larger than a length of the third input grating in the third direction.

The light source may comprise a first light source configured to emit first light and a second light source configured to emit second light, the second light emitted from the second light source having a polarization state different from a polarization state of the first light emitted from the first light source, the backlight unit may further comprise a fourth input grating and a fifth input grating that are provided on the light guide plate, and the first light source may be arranged to emit the first light toward the first input grating and the second light source is arranged to emit the second light toward the fourth input grating.

The fourth input grating may be provided on the light guide plate and configured to diffract the light from the second light source such that the light diffracted by the fourth grating propagates in a fourth direction while being totally reflected in the light guide plate; the fifth input grating and the second input grating may be symmetrical, the third input grating may be provided between the fifth input grating and the second input grating, and the fifth input grating is configured to diffract the light diffracted by the fourth input grating such that the light diffracted by the fifth input grating propagates in a fifth direction different from the fourth direction while being totally reflected in the light guide plate, wherein beam width of the light propagating in the fifth direction may increase as the light propagates in the light guide in the fifth direction; and the third input grating may be configured to diffract the light diffracted by the fifth input grating such that the light propagates in the light guide plate in the third direction.

The light guide plate may comprise a first layer and a second layer, and the backlight unit further comprises an interlayer input grating between the first and second layers, wherein the sixth input grating is configured to transmit the light from the second light source and diffract the light from the first light source.

The backlight unit may further comprise a recycle grating configured to diffract light from the output grating such that the light propagates back to the output grating.

The light guide plate may comprise a first layer, a second layer, and a third layer, and a refractive index of the second layer is different from a refractive index of at least one of the first and third layers.

According to an another aspect of the disclosure, there is provided a backlight unit comprising: a light source configured to provide coherent light; a first light guide plate comprising a light entrance surface on which the light is incident from the light source and a light exit surface through which the light is output; a first input grating provided on the first light guide plate and configured to diffract the light from the light source such that the light diffracted by the first input grating propagates in a first direction while being totally reflected in the first light guide plate; a first output grating provided on the first light guide plate and configured to diffract the light diffracted by the first input grating such that the light is output toward an outside of the first light guide plate; a second light guide plate provided on the first light guide plate, the second light guide plate comprising a light entrance surface on which the light from the first light guide plate is incident and a light exit surface through which the light propagated through the second light guide plate is output; a second input grating provided on the second light guide plate and configured to diffract the light from the first output grating such that the light diffracted by the second input grating propagates in a second direction different from the first direction while being totally reflected in the second light guide plate, wherein beam width of the light propagating in the second direction increases as the light propagates in the second light guide in the second direction; a third input grating provided on the second light guide plate and configured to diffract the light diffracted by the second input grating such that the light diffracted by the third input grating propagates in a third direction different from the second direction, wherein beam width of the light propagating in the third direction increases as the light propagates in the second light guide in the third direction; and a second output grating provided on the second light guide plate and configured to diffract the light diffracted by the third input grating such that the light is output in a direction toward an outside of the second light guide plate.

The first input grating and the first output grating may be provided on the light exit surface of the first light guide plate, and the second input grating, the third input grating, and the second output grating may be provided on the light exit surface of the second light guide plate.

An area of the first output grating may be larger than an area of the first input grating.

A length of the third input grating in the second direction may be larger than a length of the second input grating in the second direction.

A length of the second output grating in the third direction may be larger than a length of the third input grating in the third direction.

The light source may comprise a first light source configured to emit first light and a second light source configured to emit second light, the second light emitted from the second light source having a polarization state different from a polarization state of the first light emitted from the first light source, and the backlight unit may further comprise: a third light guide plate comprising a light entrance surface on which the light is incident from the second light source and a light exit surface through which the light propagating through the third light guide is output, the third light guide plate being provided on the light entrance surface of the second light guide plate spaced apart from the first light guide plate; a fourth input grating provided on the third light guide plate and configured to diffract the light from the second light source such that the light diffracted by the fourth input grating propagates in a fourth direction while being totally reflected in the third light guide plate; a third output grating provided on the third light guide plate and configured to diffract the light diffracted by the fourth input grating such that the light diffracted by the third output grating is output toward an outside of the third light guide plate; and a fifth input grating symmetrical to the second input grating with the third input grating provided therebetween and configured to diffract the light from the third output grating such that the light propagates in a fifth direction different from the fourth direction while being totally reflected in the second light guide plate, wherein the first light source is configured to emit the first light toward the first input grating, and the second light source is configured to emit the second light toward the fourth input grating.

Beam width of the light diffracted by the fifth input grating propagating in the fifth direction may increase while propagating in the second light guide in the fifth direction; and the third input grating is configured to diffract the light diffracted by the fifth input grating such that the light propagates in the second light guide plate in the third direction.

According to another aspect of the disclosure, there is provided a backlight unit package comprising: a first backlight unit comprising a first light source and a first light guide plate, wherein a plurality of first input gratings are provided on the first light guide plate to sequentially increase a beam width of first light from the first light source and a first output grating is provided to output the first light with the sequentially increased beam width by diffracting the first light in a direction toward an outside of the first light guide plate; and a second backlight unit comprising a second light source and a second light guide plate, wherein the second light source is configured to emit second light having a wavelength different from a wavelength of the first light emitted from the first light source, and wherein a plurality of second input gratings are provided on the second light guide plate to sequentially increase a beam width of the second light from the second light source and a second output grating is provided to output the second light with the sequentially increased beam width by diffracting the second light in a direction toward an outside of the second light guide plate.

According to another aspect of the disclosure, there is provided a holographic display apparatus comprising: the backlight unit package and a spatial light modulator configured to generate a holographic image by modulating light output from the backlight unit package.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
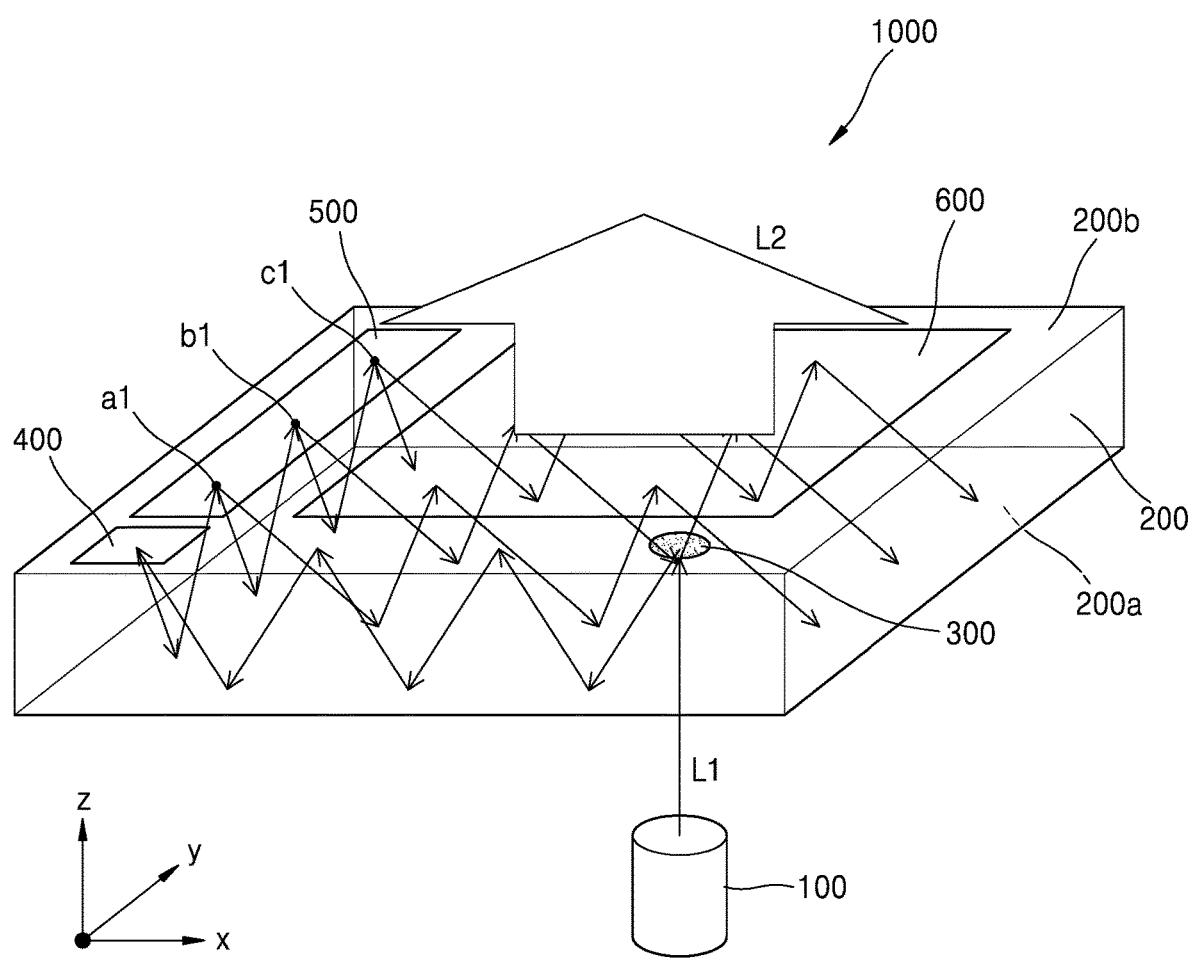
FIG. 1 is a perspective view schematically illustrating a backlight unit according to an embodiment.

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, backlight units and holographic display apparatuses including the backlight units will be described according to various embodiments with reference to the accompanying drawings. In the drawings, like reference numerals refer to like elements, and the size or thickness of each element may be exaggerated for clarity of illustration.

It will be understood that although the terms "first," "second," etc. may be used herein to describe various elements, these elements should not be limited by these terms. These terms are only used to distinguish one element from other elements. The backlight units and the holographic display apparatuses including the backlight units may be implemented in different shapes and are not limited to the embodiments described below.

In the disclosure, terms such as "unit" or "module" may be used to denote a unit that has at least one function or operation and is implemented with hardware, software, or a combination of hardware and software.

In the following description, when an element is referred to as being "above" or "on" another element, it may be directly on an upper, lower, left, or right side of the other element while making contact with the other element or may be above an upper, lower, left, or right side of the other element without making contact with the other element. Hereinafter, embodiments which are only for providing examples will be described with reference to the accompanying drawings.

In the disclosure, it will be further understood that the terms "including" and/or "comprising" specify the presence of stated features or elements, but do not preclude the presence or addition of one or more other features or elements.

Figure 2:
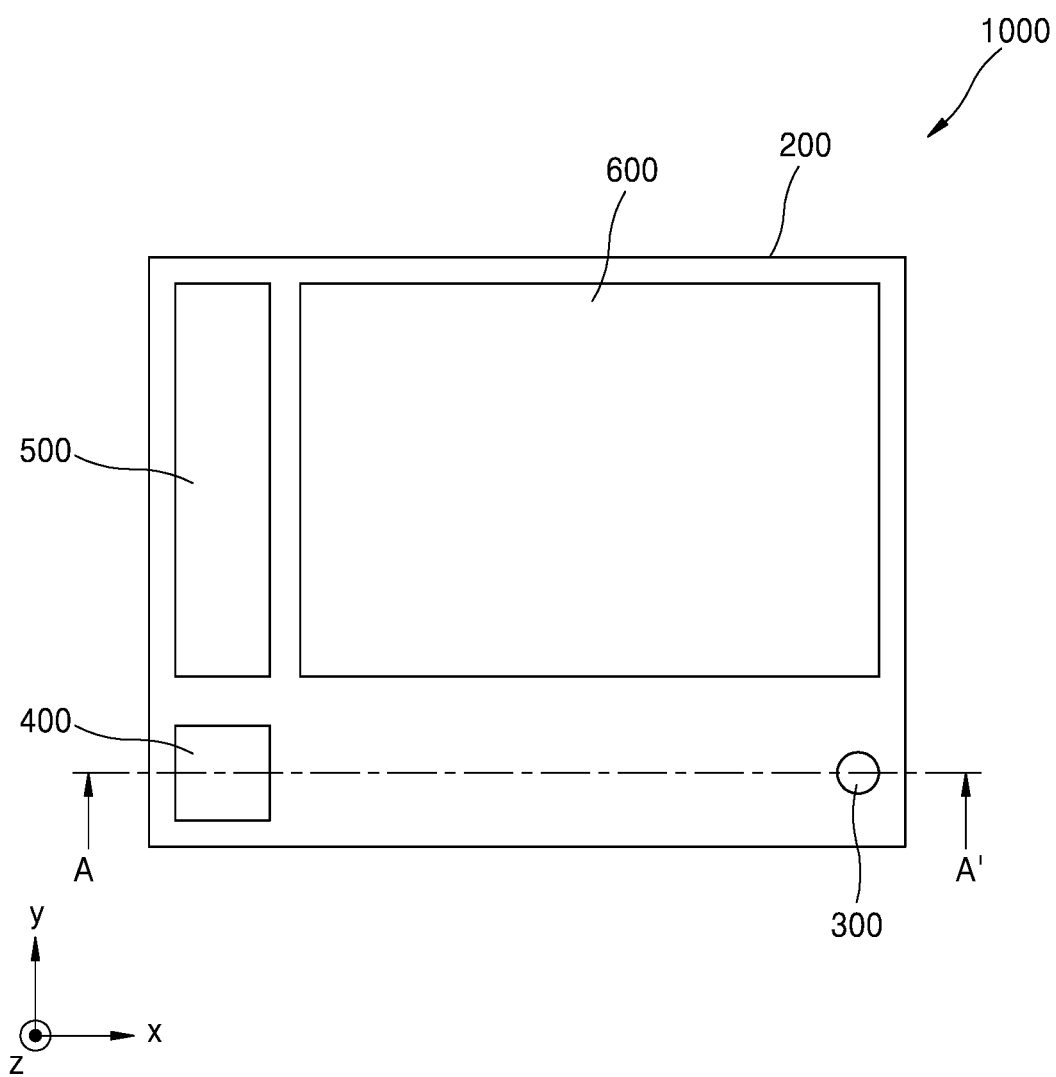
FIG. 2 is a plan view schematically illustrating the backlight unit shown in FIG. 1.

FIG. 1 is a perspective view schematically illustrating a backlight unit 1000 according to an embodiment. FIG. 2 is a plan view schematically illustrating the backlight unit 1000 shown in FIG. 1.

Referring to FIG. 1, the backlight unit 1000 may include: a light source 100 that provides coherent light L1 a light guide plate 200 that has a light entrance surface 200a on which light from the light source 100 is incident and a light exit surface 200b through which the light is output; a plurality of diffraction gratings (for example, a first input grating 300, a second input grating 400, and a third input grating 500) that are arranged (for example, clockwise) in different regions of the light guide plate 200 to sequentially diffract light from the light source 100 such that that the beam width of the light may increase as the light propagates in the light guide plate 200; and a diffraction grating (for example, an output grating 600) that diffracts and outputs the light having an increased beam width in a direction toward the outside of the light guide plate 200.

The light source 100 may provide coherent light L1. For example, the light source 100 may include a laser diode that generates light having high coherence. However, light having some degree of spatial coherence may be diffracted and modulated by a spatial light modulator such that the light may have coherence, and thus, a light source other than a laser diode may be used as long as the light source is capable of emitting light having some degree of spatial coherence.

Light L1 incident on the light guide plate 200 from the light source 100 may propagate in the light guide plate 200 and may be output from the light guide plate 200 as light L2 having different dimensional characteristics. For example, spot light incident on the light guide plate 200 may be output from the light guide plate 200 as surface light. The light guide plate 200 may have a thickness within a wide range. For example, the light guide plate 200 may have a thickness of about 0.1 mm to about 10 mm. As the thickness of the light guide plate 200 increases, the average output efficiency of the output grating 600 may increase. The output efficiency refers to the ratio of the intensity of light output from the light guide plate 200 through the output grating 600 to the intensity of light in the light guide plate 200. In addition, the average output efficiency refers to the average of output efficiency over the entire area of the output grating 600.

As described above, the beam width of light emitted from the light source 100 may be increased by the first input grating 300, the second input grating 400, and the third input grating 500 as the light propagates in the light guide plate 200, and then the light may be output from the light guide plate 200. The first input grating 300, the second input grating 400, the third input grating 500, and the output grating 600 may be provided on the light exit surface 200b of the light guide plate 200. However, this is a non-limiting example. In another example, the first input grating 300, the second input grating 400, and the third input grating 500 may be provided on the light entrance surface 200a.

The first input grating 300 may be provided on the light guide plate 200 and may diffract light coming from the light source 100 such that the light may propagate in a first direction (negative x-axis direction) while being totally reflected in the light guide plate 200. The first input grating 300 may have an area such that all the light emitted from the light source 100 may be incident on the first input grating 300.

The second input grating 400 may be provided on the light guide plate 200 spaced apart from the first input grating 300 in the first direction (negative x-axis direction) and may diffract light propagating in the first direction via the first input grating 300 such that the light may propagate in a second direction (y-axis direction) different from the first direction while being totally reflected in the light guide plate 200. The area of the second input grating 400 may be greater than the area of the first input grating 300. For example, the second input grating 400 may have an area such that light of which the beam width is increased as the light propagates from the first input grating 300 in the first direction may be entirely incident on the second input grating 400. In addition, the second input grating 400 may collimate light coming from the first input grating 300. Thus, light diffracted by the second input grating 400 may be parallel light.

The third input grating 500 may be provided on the light guide plate 200 spaced apart from the second input grating 400 in the second direction and may diffract light of which the beam width is increased as the light propagates via the second input grating 400 and then in the light guide plate 200 in the second direction such that the light may propagate in the light guide plate 200 in a third direction (x-axis direction) different from the second direction. The area of the third input grating 500 may be larger than the area of the second input grating 400. For example, the length of the third input grating 500 in the second direction may be larger than the length of the second input grating 400 in the second direction. A portion of light diffracted by the second input grating 400 may be continuously totally reflected at a plurality of points (for example, a1, b1, and c1) of the third input grating 500, which are arranged side by side, in the second direction, and another portion of the light not continuously totally reflected at the plurality of points may be diffracted in the third direction. Therefore, the beam width of light may be increased from a value corresponding to the area of the second input grating 400 to a value corresponding to the area of the third input grating 500, and then the light may propagate in the third direction. In FIG. 1, the points a1, b1, and c1 are spaced apart from each other by a given distance, but this is for ease of illustration. The points a1, b1, and c1 refer to points at which light is incident on the third input grating 500 while being totally reflected.

The output grating 600 may be provided on the light guide plate 200 spaced apart from the third input grating 500 in the third direction and may diffract and output light, where the beam width of the light is increased in the third direction as the light propagates in the light guide plate 200 via the third input grating 500 such that the light may propagate in a direction (z-axis direction) toward the outside of the light guide plate 200. The output efficiency of the output grating 600 may increase in the third direction. As described above, as the thickness of the light guide plate 200 increases, the average output efficiency of the output grating 600 may increase. Therefore, as the thickness of the light guide plate 200 increases, the minimum output efficiency of the output grating 600 may increase. The area of the output grating 600 may be larger than the area of the third input grating 500. For example, the length of the output grating 600 in the third direction may be larger than the length of the third input grating 500 in the third direction. A portion of light diffracted by the third input grating 500 may be continuously totally reflected at a plurality of points of the output grating 600, which are arranged side by side, in the third direction, and another portion of the light not continuously totally reflected at the plurality of points may be diffracted and output in a direction toward the outside of the light guide plate 200. Therefore, the beam width of light may be increased from a value corresponding to the area of the third input grating 500 to a value corresponding to the area of the output grating 600, and then the light may be output to the outside of the light guide plate 200. Output light L2 is denoted with a large arrow, but this is for ease of description. The output light L2 denoted with the large arrow refers to all the light output from a plurality of points of the output grating 600.

Referring to FIG. 2, the first input grating 300, the second input grating 400, the third input grating 500, and the output grating 600 may be sequentially arranged clockwise to increase the beam width of light output from the light source 100. However, this is a non-limiting example. In another example, the first input grating 300, the second input grating 400, the third input grating 500, and the output grating 600 may be sequentially arranged counterclockwise. In another example, the size of each of the first input grating 300, the second input grating 400, the third input grating 500 and the output grating 600 may be different. In another example, the distance between each of the first input grating 300, the second input grating 400, the third input grating 500 and the output grating 600 may be different.

Figure 3:
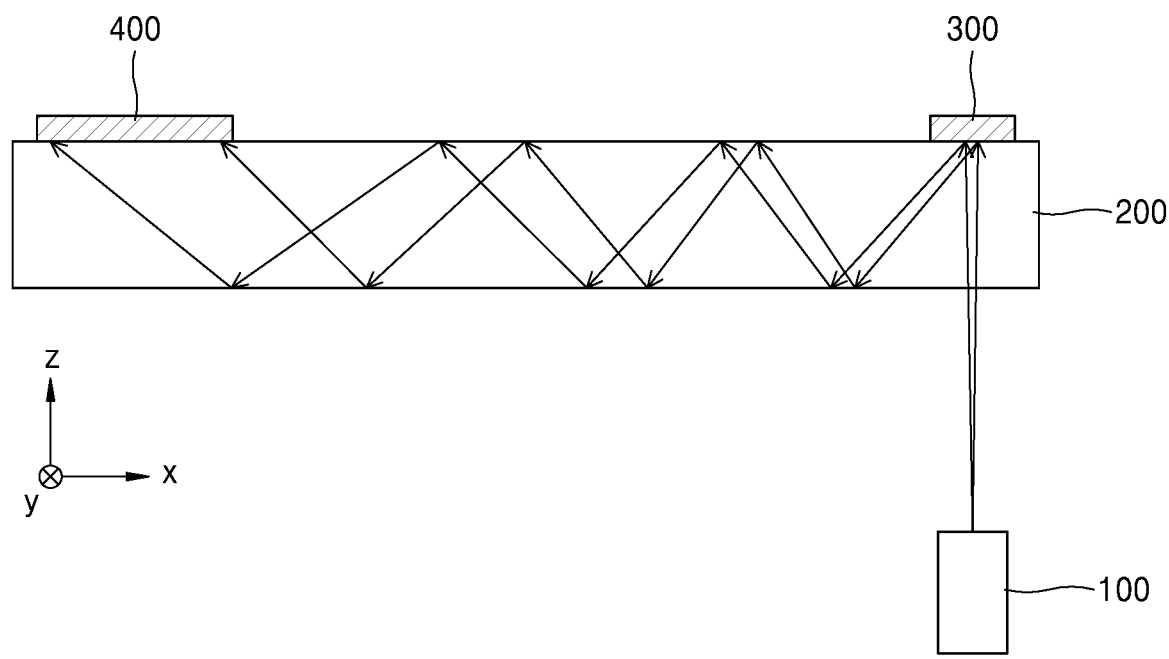
FIG. 3 is a cross-sectional view taken along line A-A' in FIG. 2.
Figure 4:
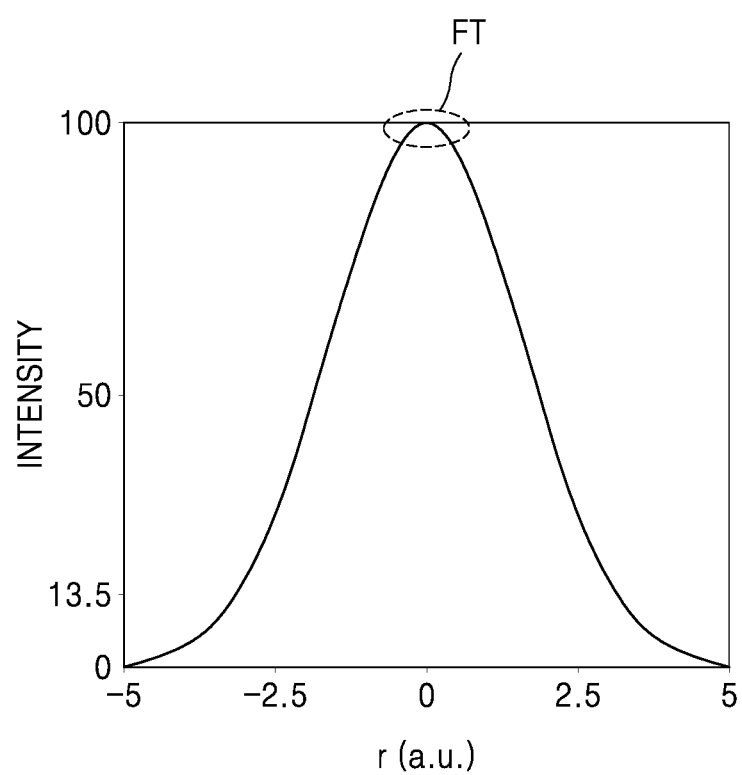
FIG. 4 is a graph illustrating the characteristics of light emitted from a light source shown in FIG. 1.

FIG. 3 is a cross-sectional view taken along line A-A' in FIG. 2. FIG. 4 is a graph illustrating the characteristics of light emitted from a light source shown in FIG. 1.

Referring to FIG. 3, light from the light source 100 may pass through the light guide plate 200 and may then be incident on the first input grating 300. The first input grating 300 may diffract the light from the light source 100 such that the light may propagate in the first direction (negative x-axis direction) while being totally reflected in the light guide plate 200. For example, the light from the light source 100 may be diffracted by the first input grating 300 and may then propagate toward the second input grating 400. In this case, the first input grating 300 may diffract a portion of the light from the light source 100. At this time, diffracting only a portion of light which is close to a beam center may be referred to as "flat-topping." The "flat-topping" will be described with reference to FIG. 4. In addition, the beam width of the light diffracted by the first input grating 300 may increase as the light propagates toward the second input grating 400.

Referring to FIG. 4, the light from the light source 100 may be a Gaussian beam of which the intensity decreases in a direction away from the center (r=0) of the beam. The first input grating 300 may be configured such that the first input grating 300 may diffract a portion of a light beam which is close to the center of the beam. In this case, the intensity distribution of light diffracted by the first input grating 300 may be relatively flat. When the first input grating 300 diffracts only a portion of light coming from the light source 100, which is in a flat intensity distribution region FT, it may be called "flat-topping". A light beam which is flat-topped by the first input grating 300 may have uniform intensity regardless of the distance from the center of the light beam.

FIGS. 5 to 8 are side cross-sectional views illustrating example structures of the first input grating 300, the second input grating 400, the third input grating 500, and the output grating 600.

Figure 5:
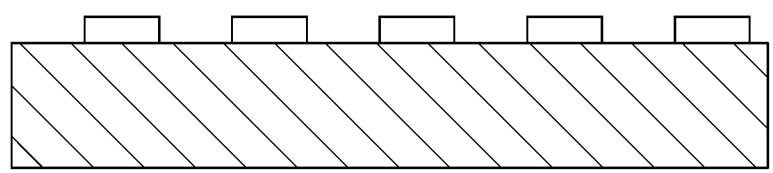
FIG. 5 is a side cross-sectional view illustrating an example structure of a first input grating, a second input grating, a third input grating and an output grating shown in FIG. 1.

Referring to FIG. 5, the first input grating 300, the second input grating 400, the third input grating 500, and the output grating 600 may be surface gratings having a diffraction efficiency of about 0.405. For instance, the pattern of the grating illustrated in FIG. 5 may have a diffraction efficiency of about 0.405.

Figure 6:
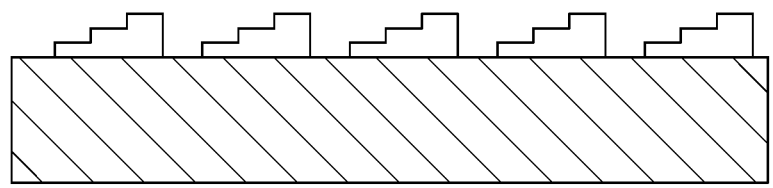
FIG. 6 is a side cross-sectional view illustrating another example structure of the first input grating, the second input grating, the third input grating and the output grating shown in FIG. 1.

Referring to FIG. 6, the first input grating 300, the second input grating 400, the third input grating 500, and the output grating 600 may be surface gratings having a diffraction efficiency of about 0.811. For instance, the pattern of the grating illustrated in FIG. 6 may have a diffraction efficiency of about 0.811.

Figure 7:
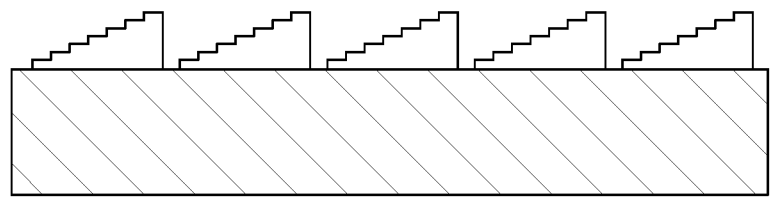
FIG. 7 is a side cross-sectional view illustrating another example structure of the first input grating, the second input grating, the third input grating and the output grating shown in FIG. 1.

Referring to FIG. 7, the first input grating 300, the second input grating 400, the third input grating 500, and the output grating 600 may be surface gratings having a diffraction efficiency of about 0.949. For instance, the pattern of the grating illustrated in FIG. 7 may have a diffraction efficiency of about 0.949.

Figure 8:
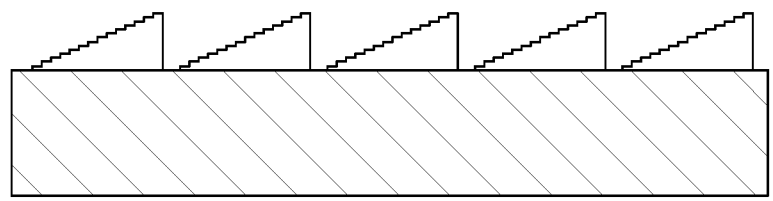
FIG. 8 is a side cross-sectional view illustrating another example structure of the first input grating, the second input grating, the third input grating and the output grating shown in FIG. 1.

Referring to FIG. 8, the first input grating 300, the second input grating 400, the third input grating 500, and the output grating 600 may be surface gratings having a diffraction efficiency of about 0.987. For instance, the pattern of the grating illustrated in FIG. 8 may have a diffraction efficiency of about 0.987.

As the diffraction efficiency of the surface gratings, which are used as the f first input grating 300, the second input grating 400, the third input grating 500, and the output grating 600 shown in FIG. 1, increases, the amount of light diffracted by the first input grating 300, the second input grating 400, the third input grating 500, and the output grating 600 may increase.

As described above, various surface gratings are illustrated in FIGS. 5 to 8 as example structures applicable to the first input grating 300, the second input grating 400, the third input grating 500 and the output grating 600. However, the first input grating 300, the second input grating 400, the third input grating 500 and the output grating 600 are not limited thereto. The first input grating 300, the second input grating 400, the third input grating 500 and the output grating 600 and may have various shapes capable of inducing intended variations in the phase of incident waves and thus varying wave-front shapes to perform functions such as expanding, condensing, or collimating light. For example, volume gratings may be used. In addition, for example, the first input grating 300, the second input grating 400, the third input grating 500 and the output grating 600 may express various diffraction patterns, and to this end, the first input grating 300, the second input grating 400, the third input grating 500 and the output grating 600 may include relief-phase gratings having physical concave-convex patterns. The relief-phase gratings may induce various variations in light when the surface profiles of the relief-phase gratings are adjusted.

Alternatively, the first input grating 300, the second input grating 400, the third input grating 500 and the output grating 600 may be implemented as holograms in which interference patterns capable of diffracting light are recorded. In addition, the first input grating 300, the second input grating 400, the third input grating 500 and the output grating 600 may include any means which is capable of guaranteeing variations in the phase of incident waves through variations in refractive index, for example, materials such as liquid crystals and polymers. The above-described gratings may be fabricated by a well-known method such as lithography or holographic recording.

Figure 9:
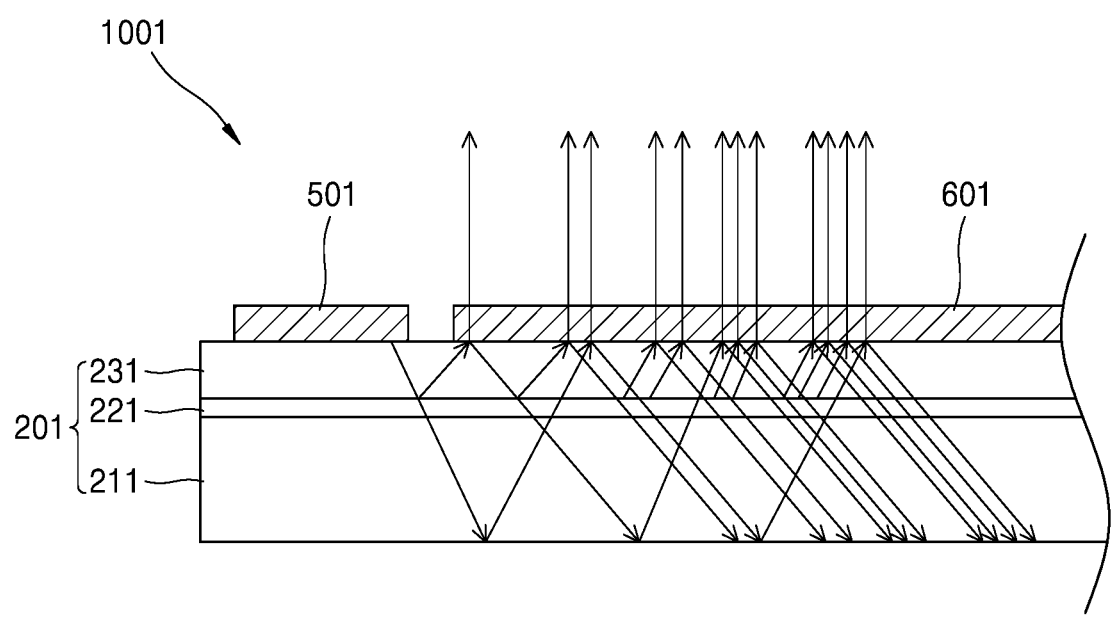
FIG. 9 is a side cross-sectional view schematically illustrating a backlight unit according to another embodiment.

FIG. 9 is a side cross-sectional view schematically illustrating a backlight unit 1001 according to another embodiment. The backlight unit 1001 shown in FIG. 9 has the same structure as the backlight unit 1000 shown in FIG. 1 except for a light guide plate 201. The following description will be given with reference to FIG. 9 except for the same description as that given with reference to FIG. 1. Hereinafter, the structure of the light guide plate 201 will be described with reference to FIG. 9.

Referring to FIG. 9, the light guide plate 201 may include two or more layers. The two or more layers may be layers that propagate light by internal reflection.

The two or more layers of the light guide plate 201 may be configured to adjust the ratio of the reflectance and transmittance of light. For example, two adjacent layers of the two or more layers may have different refractive indices. For example, the light guide plate 201 may include a first layer 211, a second layer 221, and a third layer 231, and the refractive index of the second layer 221 may be different from the refractive index of at least one of the first layer 211 and the third layer 231.

For example, the first layer 211 and the second layer 221 may have different refractive indices.

The refractive index difference between the first layer 211 and the second layer 221 may be about 0.2 or larger. In addition, the refractive index of the first layer 211 may be less than the refractive index of the second layer 221. For example, each of the first layer 211 and the second layer 221 may have a refractive index of about 1.2 to about 2.0. The first layer 211 and the second layer 221 may include a resin or glass that transmits light having a wavelength of about 400 nm to about 2000 nm.

For example, the second layer 221 and the third layer 231 may have different refractive indices. The refractive index difference between the second layer 221 and the third layer 231 may be about 0.2 or larger. In addition, the refractive index of the second layer 221 may be less than the refractive index of the third layer 231. For example, each of the second layer 221 and the third layer 231 may have a refractive index of about 1.2 to about 2.0. The second layer 221 and the third layer 231 may include a resin or glass that transmits light having a wavelength of about 400 nm to about 2000 nm.

For example, the first layer 211 and the third layer 231 may have different refractive indices or may have the same refractive indices. The second layer 221 may include an adhesive layer for bonding the first layer 211 and the third layer 231 to each other. For example, the refractive index of the second layer 221 may be the same as that of at least one of the first layer 211 and the third layer 231.

In addition, the transmittance of light may be determined by the refractive index difference between the first layer 211, the second layer 221 and the third layer 231 of the light guide plate 201. For example, the transmittance between the third layer 231 and the second layer 221 may be determined by the refractive index difference between the third layer 231 and the second layer 221. Transmitted light may propagate to the first layer 211 and may then be guided toward an output grating 601 as being totally reflected by the bottom surface of the first layer 211. In addition, light reflected at the interface between the first layer 211 and the second layer 221 may propagate toward the output grating 601. As described above, portions of light split by reflection and transmission at the interface between the first layer 211 and the second layer 221 may be respectively guided in the first layer 211 and the third layer 231 and may then be output through the output grating 601.

For example, the second layer 221 may include a dichroic coating layer. The dichroic coating layer may transmit and reflect light from a third input grating 501 according to a specific angle. For example, the dichroic coating layer may reflect 10% of light from the third input grating 501 and may transmit 90% of the light from the third input grating 501. However, the disclosure is not limited thereto, and the transmittance and reflectance of the dichroic coating layer may vary depending on designs.

When the light guide plate 201 is formed as one layer, stripes may be formed in light output through the light guide plate 201. Such stripes may be formed because of size fixation of input light or angular variations caused by beam steering. However, when the light guide plate 201 includes two or more layers as in the embodiment shown in FIG. 9, such stripes may be reduced by adjusting the number of times light is split.

Figure 10:
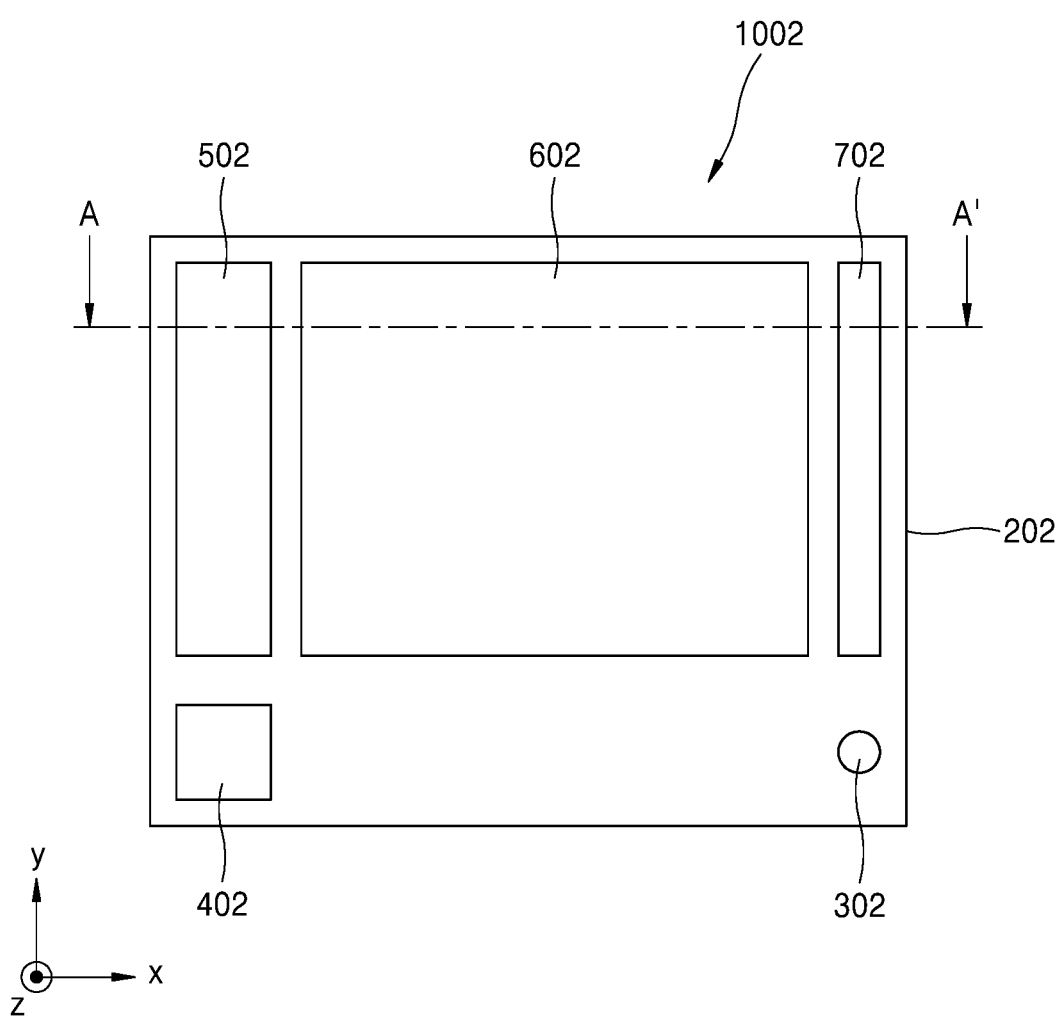
FIG. 10 is a plan view schematically illustrating a backlight unit according to another embodiment.
Figure 11:
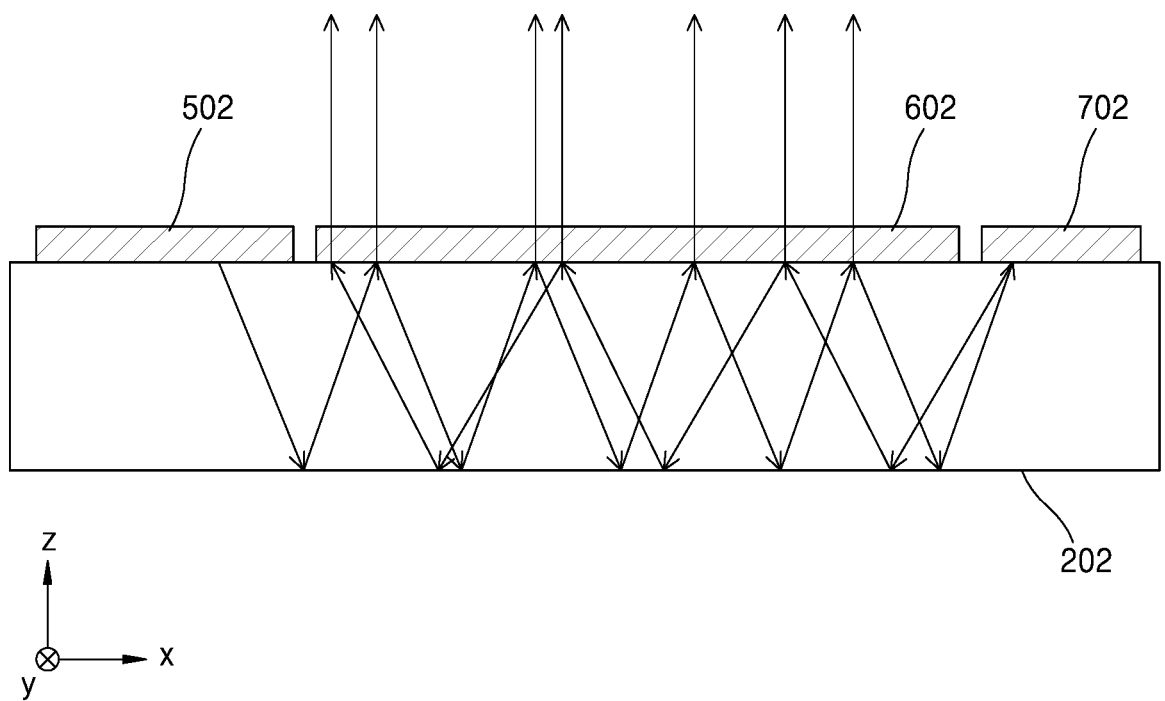
FIG. 11 is a cross-sectional view taken along line A-A' in FIG. 10.

FIG. 10 is a plan view schematically illustrating a backlight unit 1002 according to another embodiment. FIG. 11 is a cross-sectional view taken along line A-A' in FIG. 10.

The backlight unit 1002 shown in FIG. 10 has the same structure as the backlight unit 1000 shown in FIG. 1 except for a recycle grating 702. The following description will be given with reference to FIG. 10 except for the same description as that given with reference to FIG. 1. Hereinafter, the recycle grating 702 will be described with reference to FIGS. 10 and 11.

Referring to FIG. 10, the recycle grating 702 may be spaced apart from a third input grating 502 with an output grating 602 therebetween. The recycle grating 702 may diffract light from the output grating 602 to return the light to the output grating 602. For example, light diffracted by the third input grating 502 and propagating in a light guide plate 202 via the output grating 602 in a third direction (x-axis direction) may be diffracted by the recycle grating 702 in a direction in which the light is totally reflected in the light guide plate 202 back to the output grating 602.

In addition, the light guide plate 202 of the backlight unit 1002 may include two or more layers having different refractive indices, and thus, light output from the light guide plate 202 may have fewer stripes as described with reference to FIG. 9.

Referring to FIG. 11, the third input grating 502 may diffract light such that the light may propagate in the light guide plate 202 in the third direction (x-axis direction) while being totally reflected. A portion of the light propagating in the third direction may be diffracted by the output grating 602 in a direction toward the outside of the light guide plate 202. Another portion of the light, which is not output, may continuously propagate in the third direction while being totally reflected in the light guide plate 202. Light passing via the output grating 602 may be incident on the recycle grating 702, which is spaced apart from the output grating 602, in the third direction. The recycle grating 702 may diffract the incident light such that the light may propagate back to the output grating 602 while being totally reflected in the light guide plate 202. A portion of the light diffracted by the recycle grating 702 may be diffracted by the output grating 602 in a direction toward the outside of the light guide plate 202. As described above, light that is not primarily output through the output grating 602 may be sent back to the output grating 602 by the recycle grating 702 and may be output through the output grating 602, and thus, optical loss may be reduced.

Figure 12:
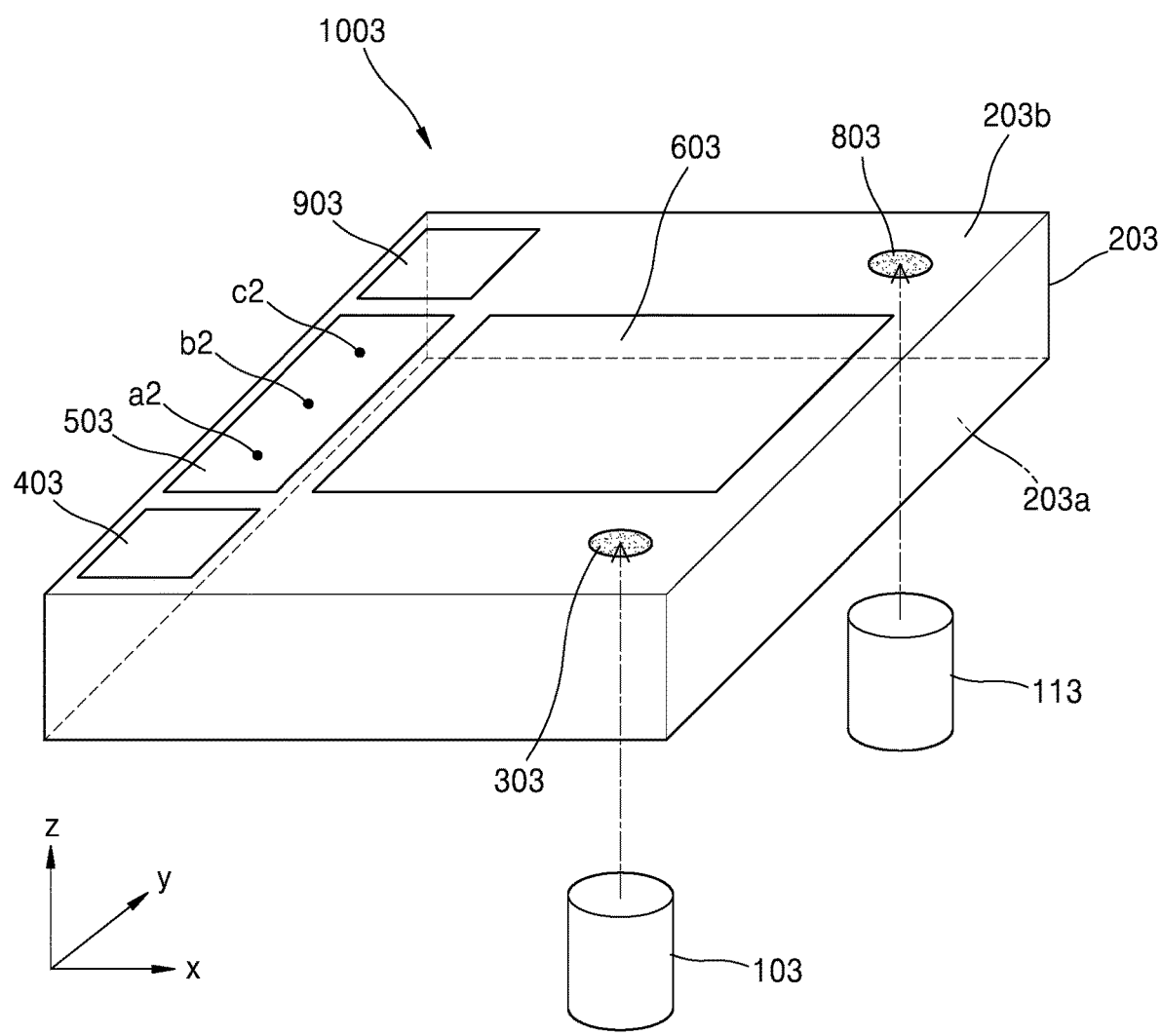
FIG. 12 is a perspective view schematically illustrating a backlight unit according to another embodiment.

FIG. 12 is a side cross-sectional view schematically illustrating a backlight unit 1003 according to another embodiment. The backlight unit 1003 shown in FIG. 12 may include the same structure as the backlight unit 1000 shown FIG. 1 except for a second light source 113, a fourth input grating 803, and a fifth input grating 903. Hereinafter, the backlight unit 1003 shown in FIG. 12 will be described by focusing on characteristics different from those of the backlight unit 1000 shown in FIG. 1.

Referring to FIG. 12, the backlight unit 1003 may include: the second light source 113 that provides coherent light; a light guide plate 203 that has a light entrance surface 203*a* on which light from the second light source 113 is incident and a light exit surface 203*b* through which the light is output; a plurality of diffraction gratings (for example, a third input grating 503, the fourth input grating 803, and the fifth input grating 903) that are arranged in different regions of the light guide plate 203 to sequentially diffract light from the second light source 113 such that that the beam width of the light may increase as the light propagates in the light guide plate 203; and a diffraction grating (for example, an output grating 603) that diffracts and outputs the light having an increased beam width in a direction toward the outside of the light guide plate 203.

The second light source 113 may emit light having a polarization state different from light emitted from a first light source 103. For example, the first light source 103 may emit light having a first polarization state, and the second light source 113 may emit light having a second polarization state. The first light source 103 may be for generating images for the right eye (right-eye images), and the second light source 113 may be for generating images for the left eye (left-eye images). The second light source 113 may be configured to emit light toward the fourth input grating 803 unlike the first light source 103 configured to emit light toward a first input grating 303.

The fourth input grating 803 may be provided on the light guide plate 203 and may diffract light from the second light source 113 such that the light may propagate in a fourth direction (negative x-axis direction) while being totally reflected in the light guide plate 203. In this case, the fourth direction may be parallel to the first direction in FIG. 1. The fourth input grating 803 and the first input grating 303 may be symmetrically positioned with the output grating 603 therebetween. The fourth input grating 803 may have an area such that all spot light emitted from the second light source 113 may be incident on the fourth input grating 803.

The fifth input grating 903 may be provided on the light guide plate 203 spaced apart from the fourth input grating 803 in the fourth direction and may diffract light which propagates in the fourth direction via the fourth input grating 803 such that the light may propagate in a fifth direction (negative y-axis direction) different from the fourth direction while being totally reflected in the light guide plate 203. In this case, the fourth direction may be opposite the second direction in FIG. 2. The fifth input grating 903 and a second input grating 403 may be symmetrically positioned with the third input grating 503 therebetween. The area of the fifth input grating 903 may be larger than the area of the fourth input grating 803. For example, the fifth input grating 903 may have an area such that light of which the beam width is increased as the light propagates from the fourth input grating 803 in the fourth direction may be entirely incident on the fifth input grating 903. In addition, the fifth input grating 903 may collimate light from the fourth input grating 803. Thus, light diffracted by the fifth input grating 903 may be parallel light.

The third input grating 503 may be provided on the light guide plate 203 spaced apart from the fifth input grating 903 in the fifth direction and may diffract light of which the beam width is increased in the fifth direction as the light propagates in the light guide plate 203 via the fifth input grating 903 such that the light may propagate in the light guide plate 203 in a third direction (x-axis direction) different from the fifth direction. In this manner, not only light coming from the second input grating 403 but also light coming from the fifth input grating 903 may be diffracted by the third input grating 503 in the third direction. The area of the third input grating 503 may be larger than the area of the fifth input grating 903. For example, the length of the third input grating 500 in the fifth direction may be larger than the length of the fifth input grating 903 in the fifth direction. A portion of light diffracted by the fifth input grating 903 may be continuously totally reflected at a plurality of points (for example, a2, b2, and c2) of the third input grating 503, which are arranged side by side, in the fifth direction, and another portion of the light may be diffracted in the third direction. Therefore, the beam width of light may be increased from a value corresponding to the area of the fifth input grating 903 to a value corresponding to the area of the third input grating 503, and then the light may propagate in the third direction. In FIG. 12, the points a2, b2, and c2 are spaced apart from each other by a given distance, but this is for ease of illustration. The points a2, b2, and c2 refer to points at which light is incident on the third input grating 503 while the light is totally reflected.

Unlike in the embodiment shown in FIG. 12, when left-eye images and right-eye images are generated using only one light source, interference fringes may be formed due to light interference in the process of generating the left-eye images and the right-eye images. Such stripes may degrade the quality of images. However, as described above, when left-eye images and right-eye image are generated using the first and second light sources 103 and 113, it is possible to reduce light interference and suppress the formation of interference fringes.

In addition, the light guide plate 203 of the backlight unit 1003 may include two or more layers having different refractive indices, and thus, light output from the light guide plate 203 may have fewer stripes as described with reference to FIG. 9.

In addition, as described with reference to FIGS. 10 and 11, the backlight unit 1003 may include a recycle grating, and thus, light, which is not primarily output through the output grating 603, may be sent back to the output grating 603 and may be secondarily output through the output grating 603, thereby reducing optical loss.

Figure 13:
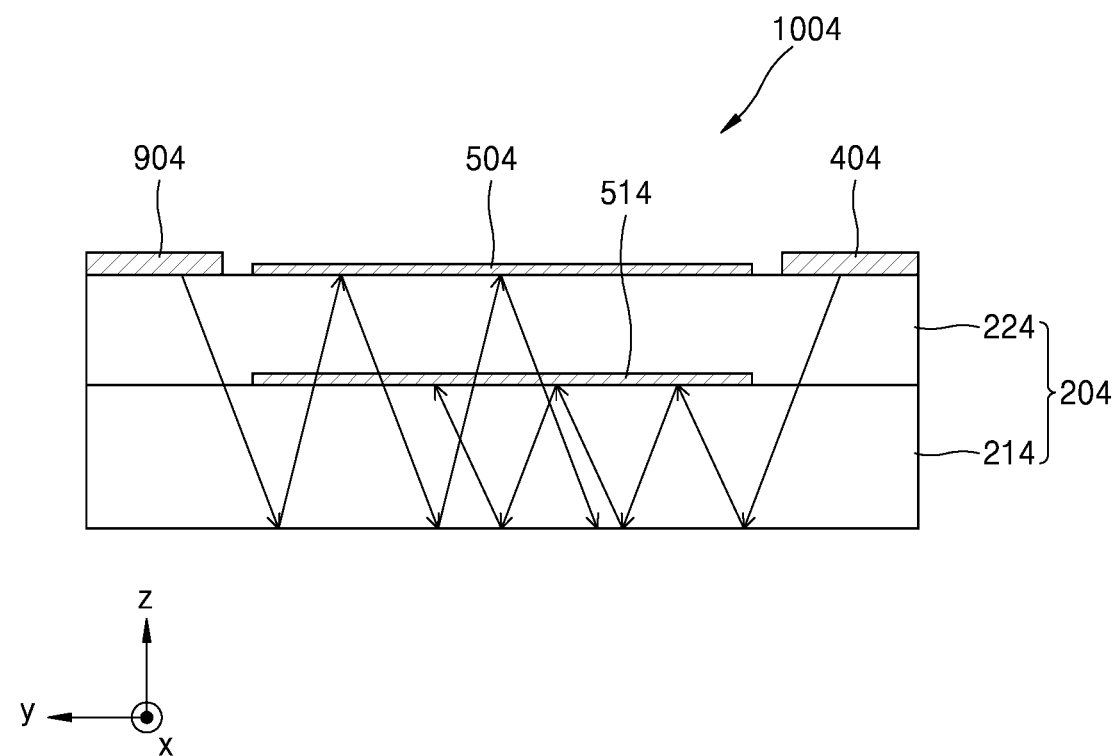
FIG. 13 is a side cross-sectional view schematically illustrating a backlight unit according to another embodiment.

FIG. 13 is a side cross-sectional view schematically illustrating a backlight unit 1004 according to another embodiment. The backlight unit 1004 shown in FIG. 13 may have the same structure as the backlight unit 1003 shown in FIG. 12 except for an interlayer input grating 514 and a light guide plate 204. Hereinafter, the backlight unit 1004 shown in FIG. 13 will be described by focusing on characteristics different from those of the backlight unit 1003 shown in FIG. 12.

Referring to FIG. 13, the backlight unit 1004 may include: the light guide plate 204 including a first layer 214 and a second layer 224; the interlayer input grating 514 provided between the first layer 214 and the second layer 224; and a third input grating 504 provided on the second layer 224.

As described with reference to FIG. 12, a second input grating 404 may diffract light from a first light source such that the light may propagate in a second direction (y-axis direction) while being totally reflected in the light guide plate 204. Light diffracted by the second input grating 404 may pass through the first layer 214 and may be totally reflected by the bottom surface of the first layer 214 to the interlayer input grating 514. A portion of the light incident on the interlayer input grating 514 may be totally reflected and may propagate in the second direction, and another portion of the light may be diffracted, totally reflected in the light guide plate 204 and propagate in a third direction (x-axis direction). In this case, the interlayer input grating 514 may be designed not to transmit light having a first polarization state from the first light source, and thus light coming from the second input grating 404 may not pass through the interlayer input grating 514. Thus, light from the second input grating 404 may not propagate into the second layer 224 after being total reflected at the bottom surface of the first layer 214.

In addition, as described with reference to FIG. 12, a fifth input grating 904 may diffract light from a second light source such that the light may be totally reflected in the light guide plate 204 and propagate in a fifth direction (negative y-axis direction). The light diffracted by the fifth input grating 904 may pass through the first layer 214 and may be totally reflected at the bottom surface of the first layer 214, and may then pass through the interlayer input grating 514 and may be incident on the third input grating 504. A portion of the light incident on the third input grating 504 may be totally reflected and may propagate in the second direction, and another portion of the light may be diffracted, totally reflected in the light guide plate 204, and propagate in the third direction (x-axis direction). In this case, the interlayer input grating 514 may be designed to transmit light having a second polarization state from the second light source, and thus light coming from the fifth input grating 904 may pass through the interlayer input grating 514. Thus, light from the fifth input grating 904 may be totally reflected at the bottom surface of the first layer 214 and may then be guided into the second layer 224.

As described above, the backlight unit 1004 may include the interlayer input grating 514 which does not transmit light having the first polarization state but transmits light having the second polarization state. As a result, light having different polarization states may be independently diffracted in the third direction (x-axis direction) by different input gratings which are provided at different positions.

In addition, the light guide plate 204 of the backlight unit 1004 may include two or more layers having different refractive indices, and thus light output from the light guide plate 204 may have fewer stripes as described with reference to FIG. 9.

In addition, as described with reference to FIGS. 10 and 11, the backlight unit 1004 may include a recycle grating, and thus, light which is not primarily output through an output grating may be sent back to the output grating and may be secondarily output through the output grating, thereby reducing optical loss.

Figure 14:
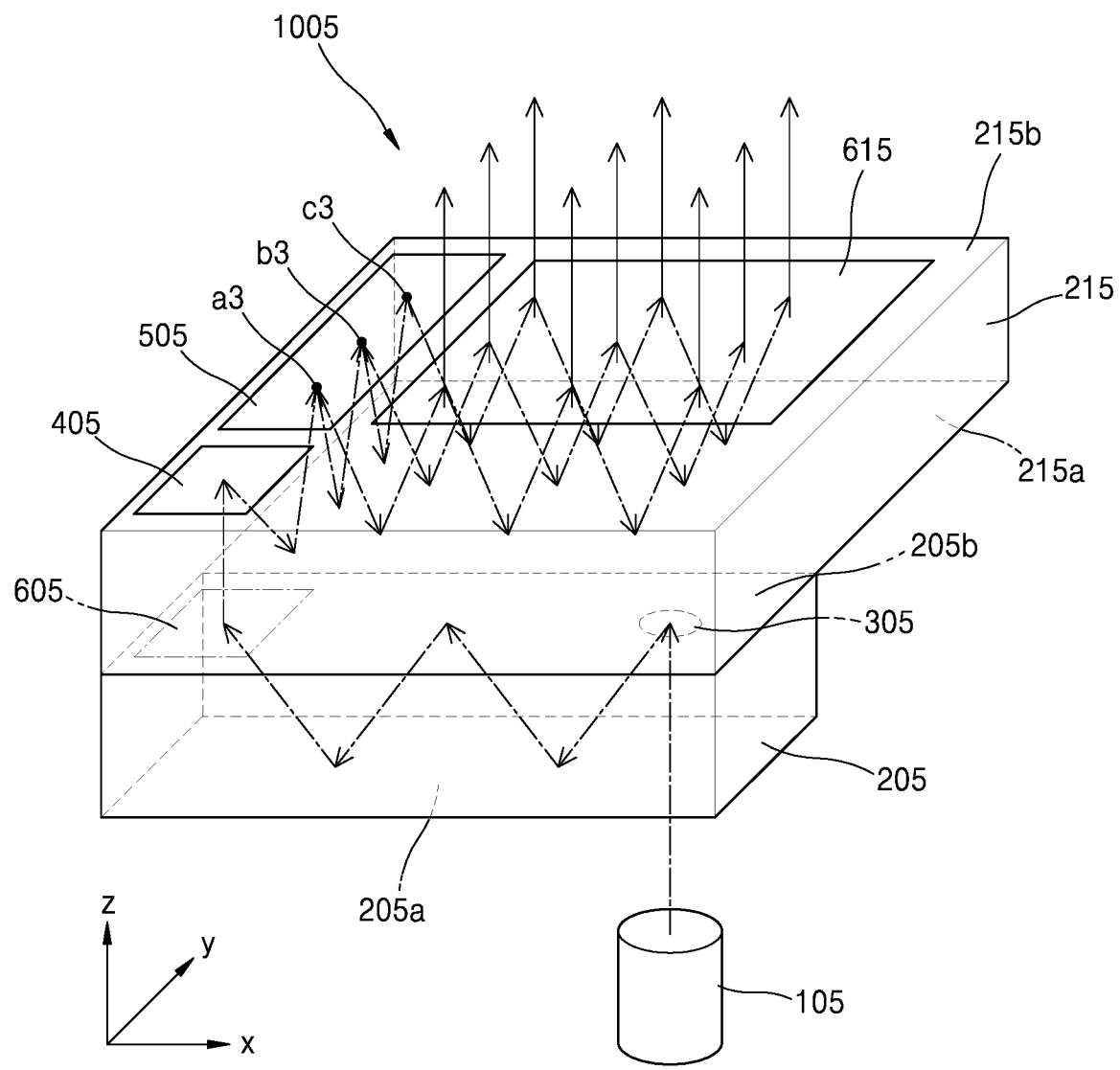
FIG. 14 is a perspective view schematically illustrating a backlight unit according to another embodiment.

FIG. 14 is a perspective view schematically illustrating a backlight unit 1005 according to another embodiment.

Referring to FIG. 14, the backlight unit 1005 may include: a light source 105 that provides coherent light; a first light guide plate 205 that has a light entrance surface 205a on which light from the light source 105 is incident and a light exit surface 205b through which the light is output; a first input grating 305 that is provided on the first light guide plate 205 and diffracts light from the light source 105 such that the light may propagate in a first direction (negative x-axis direction) while being totally reflected in the first light guide plate 205; a first output grating 605 that is provided on the first light guide plate 205 spaced apart from the first input grating 305 in the first direction, and diffracts light propagating in the first direction via the first input grating 305 such that the light may be output in a direction toward the outside of the first light guide plate 205; a second light guide plate 215 that is provided on the first light guide plate 205 and has a light entrance surface 215a on which light from the first output grating 605 is incident and a light exit surface 215b through which the light is output; a plurality of diffraction gratings (for example, a second input grating 405 and a third input grating 505) that are arranged in different regions of the second light guide plate 215 and sequentially diffract light coming from the first output grating 605 such that the beam width of the light may increase while the light propagates in the second light guide plate 215; and a diffraction grating (for example, a second output grating 615) that diffracts and outputs the light having an increased beam width in a direction toward the outside of the second light guide plate 215.

The beam width of light from the light source 105 may increase while the light is diffracted by the first input grating 305 and propagates in the first light guide plate 205, and then the light may be output to the outside of the first light guide plate 205 through the first output grating 605. The first input grating 305 and the first output grating 605 may be provided on the light exit surface 205b of the first light guide plate 205. However, this is a non-limiting example. In another example, the first input grating 305 may be provided on the light entrance surface 205a of the first light guide plate 205.

In addition, light output through the first output grating 605 may be incident on the light entrance surface 215a of the second light guide plate 215 provided on the first light guide plate 205. The light entrance surface 215a of the second light guide plate 215 may face the light exit surface 205b of the first light guide plate 205. In addition, the area of the light exit surface 205b of the first light guide plate 205 may be less than the area of the light entrance surface 215a of the second light guide plate 215. While the light output from the first output grating 605 propagates in the second light guide plate 215, the beam width of the light may be sequentially increased by the second input grating 405, the third input grating 505, and the second output grating 615, and then the light may be output to the outside of the second light guide plate 215. The second input grating 405, the third input grating 505, and the second output grating 615 may be provided on the light exit surface 215b of the second light guide plate 215. However, this is a non-limiting example. In another example, the second input grating 405 and the third input grating 505 may be provided on the light entrance surface 215a of the second light guide plate 215.

The light source 105 may be the same as the light source 100 shown in FIG. 1.

Light incident on the first light guide plate 205 from the light source 105 may propagate in the first light guide plate 205 and may be output from the first light guide plate 205 as light having different dimensional characteristics. For example, spot light incident on the first light guide plate 205 may be output from the first light guide plate 205 as surface light.

The first input grating 305 may have an area such that all light emitted from the light source 105 may be incident on the first input grating 300. The first input grating 305 may flat-top light from the light source 105 as described with reference to FIG. 4.

The area of the first output grating 605 may be larger than the area of the first input grating 305. For example, the first output grating 605 may have an area such that light of which the beam width is increased as the light propagates from the first input grating 305 in the first direction may be entirely incident on the first output grating 605. In addition, the first output grating 605 may collimate light coming from the first input grating 305. Thus, light diffracted by the first output grating 605 may be parallel light.

The light entrance surface 215a of the second light guide plate 215 may face the light exit surface 205b of the first light guide plate 205. Light incident on the second light guide plate 215 from the first output grating 605 may propagate in the second light guide plate 215 and may be output from the second light guide plate 215 as light having different dimensional characteristics. For example, when surface light is incident on the second light guide plate 215, the second light guide plate 215 may increase the beam area of the surface light and then output the surface light. The area of the light entrance surface 215a of the second light guide plate 215 may be larger than the area of the light exit surface 205b of the first light guide plate 205.

The second input grating 405 may be provided on the second light guide plate 215 at a position at which light is incident from the first output grating 605. The second input grating 405 may diffract incident light such that the light may propagate in a second direction (y-axis direction) different from the first direction while the light is totally reflected in the second light guide plate 215. The area of the second input grating 405 may be greater than or equal to the area of the first output grating 605. For example, the second input grating 405 may have an area such that all light coming from the first output grating 605 may be incident on the second input grating 405. In addition, the second input grating 405 may collimate light coming from the first output grating 605.

The third input grating 505 may be provided on the second light guide plate 215 and may be spaced apart from the second input grating 405 in the second direction. The third input grating 505 may diffract light of which the beam width is increased in the second direction as the light propagates in the second light guide plate 215 via the second input grating 405, such that the light may propagate in a third direction (x-axis direction) different from the second direction. The area of the third input grating 505 may be larger than the area of the second input grating 405. For example, the length of the third input grating 505 in the second direction may be larger than the length of the second input grating 405 in the second direction. A portion of light diffracted by the second input grating 405 may be continuously totally reflected at a plurality of points (for example, a3, b3, and c3) of the third input grating 505, which are arranged side by side, in the second direction, and another portion of the light may be diffracted in the third direction. Therefore, the beam width of light may be increased from a value corresponding to the area of the second input grating 405 to a value corresponding to the area of the third input grating 505, and then the light may propagate in the third direction. In FIG. 14, the points a3, b3, and c3 are spaced apart from each other by a given distance, but this is for ease of illustration. The points a3, b3, and c3 refer to points at which light is incident on the third input grating 505 while the light is totally reflected.

The second output grating 615 may be provided on the second light guide plate 215 spaced apart from the third input grating 505 in the third direction and may diffract light of which the beam width is increased in the third direction as the light propagates in the second light guide plate 215 via the third input grating 505 such that the light may propagate in a direction (z-axis direction) toward the outside of the second light guide plate 215. The area of the second output grating 615 may be larger than the area of the third input grating 505. For example, the length of the second output grating 615 in the third direction may be larger than the length of the third input grating 505 in the third direction. A portion of light diffracted by the third input grating 505 may be continuously totally reflected at a plurality of points of the second output grating 615 which are arranged side by side in the third direction, and another portion of the light may be diffracted and output in a direction toward the outside of the second light guide plate 215. Therefore, the beam width of light may be increased from a value corresponding to the area of the third input grating 505 to a value corresponding to the area of the second output grating 615, and then the light may be output to the outside of the second light guide plate 215.

In addition, the second light guide plate 215 of the backlight unit 1005 may include two or more layers having different refractive indices, and thus, light output from the second light guide plate 215 may have fewer stripes as described with reference to FIG. 9.

In addition, as described with reference to FIGS. 10 and 11, the backlight unit 1005 may include a recycle grating, and thus, light which is not primarily output through the second output grating 615 may be sent back to the second output grating 615 and may then be secondarily output through the second output grating 615, thereby reducing optical loss.

Figure 15:
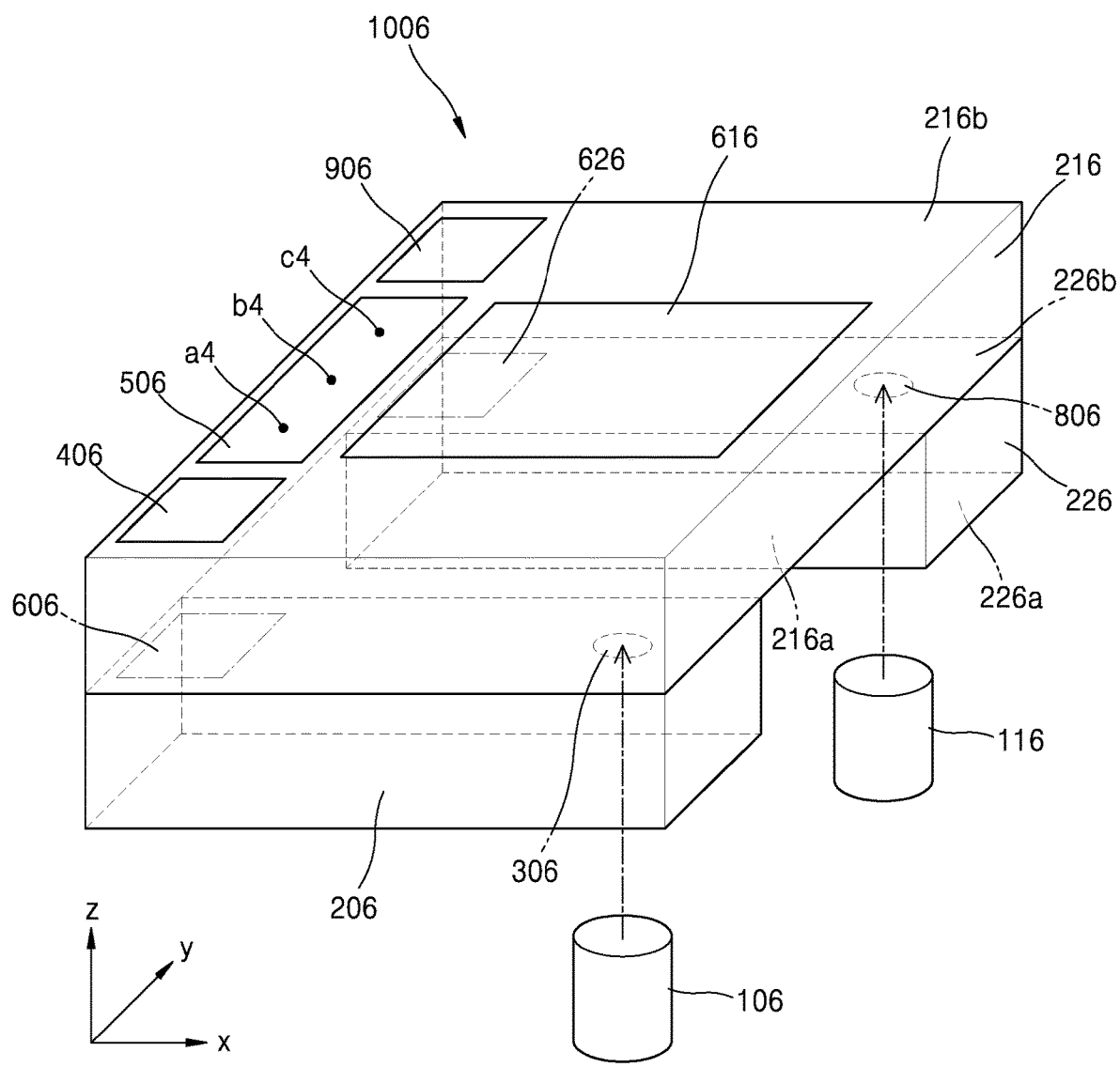
FIG. 15 is a perspective view schematically illustrating a backlight unit according to another embodiment.

FIG. 15 is a side cross-sectional view schematically illustrating a backlight unit 1006 according to another embodiment. The backlight unit 1006 shown in FIG. 15 may have the same structure as the backlight unit 1005 shown in FIG. 14 except for a second light source 116, a third light guide plate 226, a fourth input grating 806, a third output grating 626, and a fifth input grating 906. Hereinafter, the backlight unit 1006 shown in FIG. 15 will be described by focusing on characteristics different from those of the backlight unit 1005 shown in FIG. 14.

Referring to FIG. 15, the backlight unit 1006 may include: the second light source 116 that provides coherent light; the third light guide plate 226 that has a light entrance surface 226a on which light from the second light source 116 is incident and a light exit surface 226b through the light is output, the third light guide plate 226 being provided on a light entrance surface 216a of a second light guide plate 216 spaced apart from a third light guide plate 206; the fourth input grating 806 that is provided on the third light guide plate 226 and diffracts light from the second light source 116 such that the light may propagate in a fourth direction (negative x-axis direction) while being totally reflected in the third light guide plate 226; the third output grating 626 that is provided on the third light guide plate 226 spaced apart from the fourth input grating 806 in the fourth direction and diffracts light propagating in the fourth direction via the fourth input grating 806 such that the light may be output in a direction toward the outside of the third light guide plate 226; the second light guide plate 216 that is provided on the third light guide plate 226, the second light guide plate 216 having a light entrance surface 216a on which light from a first output grating 606 is incident and a light exit surface 216b through which the light is output; a plurality of diffraction gratings (for example, a third input grating 506 and the fifth input grating 906) that are arranged in different regions of the second light guide plate 216 and sequentially diffract light from the third output grating 626 such that the beam width of the light may be increased while the light propagates in the second light guide plate 216; and a diffraction grating (for example, a second output grating 616) that diffracts the light having an increased beam width in a direction toward the outside of the second light guide plate 216.

The beam width of light from the second light source 116 may increase while the light is diffracted by the fourth input grating 806 and propagates in the third light guide plate 226, and then the light may be output to the outside of the third light guide plate 226 through the third output grating 626. The fourth input grating 806 and the third output grating 626 may be provided on the light exit surface 226b of the third light guide plate 226. However, this is a non-limiting example. In another example, the fourth input grating 806 may be provided on the light entrance surface 226a of the third light guide plate 226.

In addition, light output through the third output grating 626 may be incident on the light entrance surface 216a of the second light guide plate 216 provided on the third light guide plate 226. The light entrance surface 216a of the second light guide plate 216 may face the light exit surface 226b of the third light guide plate 226. In addition, the area of the light exit surface 226b of the third light guide plate 226 may be less than the area of the light entrance surface 216a of the second light guide plate 216. While light output from the third output grating 626 propagates in the second light guide plate 216, the beam width of the light may be sequentially increased by the fifth input grating 906, the third input grating 506, and the second output grating 616, and then the light may be output to the outside of the second light guide plate 216. The fifth input grating 906, the third input grating 506, and the second output grating 616 may be provided on the light exit surface 216b of the second light guide plate 216. However, this is a non-limiting example. In another example, the fifth input grating 906 and the third input grating 506 may be provided on the light entrance surface 215a of the second light guide plate 215.

The second light source 116 may emit light having a polarization state different from light emitted from a first light source 106. For example, the first light source 106 may emit light having a first polarization state, and the second light source 116 may emit light having a second polarization state. The first light source 106 may be for generating images for the right eye, and the second light source 116 may be for generating images for the left eye. The second light source 116 may be configured to emit light toward the fourth input grating 806 unlike the first light source 106 configured to emit light toward a first input grating 306.

The fourth input grating 806 may be provided on the third light guide plate 226 and may diffract light emitted from the second light source 116 such that the light may propagate in the fourth direction (negative x-axis direction) while being totally reflected in the third light guide plate 226. In this case, the fourth direction may be parallel to the first direction in FIG. 14. The fourth input grating 806 and the first input grating 306 may be symmetrically positioned with respect to the second output grating 616. The fourth input grating 806 may have an area such that all spot light emitted from the second light source 116 may be incident on the fourth input grating 803.

The area of the third output grating 626 may be larger than the area of the fourth input grating 806. For example, the third output grating 626 may have an area such that light of which the beam width is increased as the light propagates from the fourth input grating 806 in the fourth direction may be entirely incident on the third output grating 626. In addition, the third output grating 626 may collimate light coming from the fourth input grating 806. Thus, light diffracted by the third output grating 626 may be parallel light.

Light incident on the second light guide plate 216 from the third output grating 626 may propagate in the second light guide plate 216 and may be output from the second light guide plate 216 as light having different dimensional characteristics. For example, when surface light is incident on the second light guide plate 216, the second light guide plate 216 may increase the beam area of the surface light and then output the surface light.

The fifth input grating 906 may be provided on the second light guide plate 216 at a position at which light from the fourth input grating 806 is incident, and may diffract the light such that the light may propagate in a fifth direction (negative y-axis direction) different from the fourth direction while being totally reflected in the second light guide plate 216. In this case, the fifth direction may be opposite the second direction in FIG. 14. The fifth input grating 906 and a second input grating 406 may be symmetrically positioned with the third input grating 506 therebetween. The area of the fifth input grating 906 may be larger than or equal to the area of the third output grating 626. For example, the fifth input grating 906 may have an area such that all light coming from the third output grating 626 may be incident on the fifth input grating 906. In addition, the fifth input grating 906 may collimate light coming from the third output grating 626.

The third input grating 506 may be provided on the second light guide plate 216 spaced apart from the fifth input grating 906 in the fifth direction. The third input grating 506 may diffract light of which the beam width is increased in the fifth direction as the light propagates in the second light guide plate 216 via the fifth input grating 906 such that the light may propagate in a third direction (x-axis direction) different from the fifth direction. In this manner, not only light coming from the second input grating 406 but also light coming from the fifth input grating 906 may be diffracted by the third input grating 506 in the third direction. The area of the third input grating 506 may be larger than the area of the fifth input grating 906. For example, the length of the third input grating 506 in the fifth direction may be larger than the length of the fifth input grating 906 in the fifth direction. A portion of light diffracted by the fifth input grating 906 may be continuously totally reflected at a plurality of points (for example, a4, b4, and c4) of the third input grating 506 arranged side by side in the fifth direction, and another portion of the light may be diffracted in the third direction. Therefore, the beam width of light may be increased from a value corresponding to the area of the fifth input grating 906 to a value corresponding to the area of the third input grating 506, and then the light may propagate in the third direction. In FIG. 15, the points a4, b4, and c4 are spaced apart from each other by a given distance, but this is for ease of illustration. The points a4, b4, and c4 refer to points at which light is incident on the third input grating 506 while being totally reflected.

In the embodiment shown in FIG. 15, the two light sources 106 and 116 are used to reduce light interference and suppress the formation interference fringes as described with reference to FIG. 12.

In addition, the second light guide plate 216 of the backlight unit 1006 may include two or more layers having different refractive indices, and thus light output from the second light guide plate 216 may have fewer stripes as described with reference to FIG. 9.

In addition, as described with reference to FIGS. 10 and 11, the backlight unit 1006 may include a recycle grating, and thus light which is not primarily output through the second output grating 616 may be sent back to the second output grating 616 and may then be secondarily output through the second output grating 616, thereby reducing optical loss.

Figure 16:
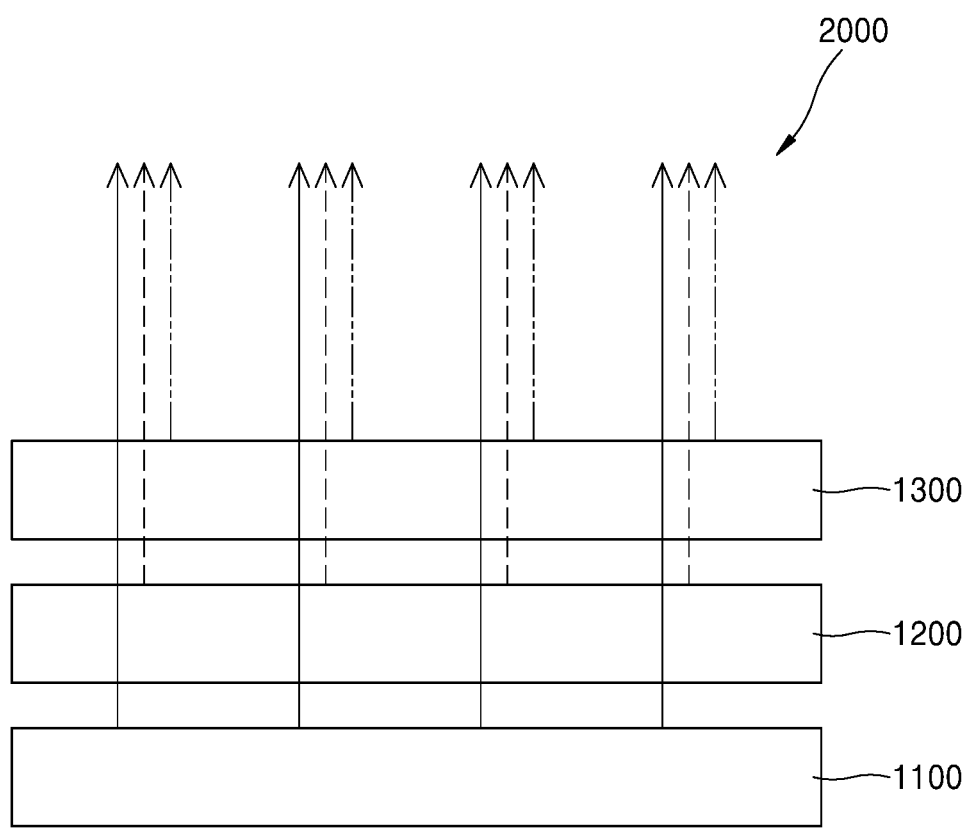
FIG. 16 is a side cross-sectional view schematically illustrating a backlight unit package according to an embodiment.

FIG. 16 is a side cross-sectional view schematically illustrating a backlight unit package 2000 according to an embodiment.

Referring to FIG. 16, the backlight unit package 2000 may include: a first backlight unit 1100 emitting parallel light having a first wavelength (for example, blue light), a second backlight unit 1200 emitting parallel light having a second wavelength (for example, green light) and a third backlight unit 1300 emitting parallel light having a third wavelength (for example, red light). The first backlight unit 1100, the second backlight unit 1200, and the third backlight unit 1300 may be sequentially stacked. Light from the first backlight unit 1100 provided on a lower side may pass through the second backlight unit 1200 and the third backlight unit 1300. Light from the second backlight unit 1200 provided above the first backlight unit 1100 may pass through the third backlight unit 1300. White light may be formed as light having different wavelengths from the first backlight unit 1100, the second backlight unit 1200, and the third backlight unit 1300 mix with each other. According to an embodiment, in the structure illustrated in FIG. 16, parallel white light may be output from the backlight unit package 2000. Each of the first backlight unit 1100, the second backlight unit 1200, and the third backlight unit 1300 may include one of the backlight units 1000, 1001, 1002, 1003, 1004, 1005, and 1006 that are described with reference to FIGS. 1 to 15.

For example, the first backlight unit 1100 may include a first light source and a first light guide plate. A plurality of first input gratings and a first output grating may be provided on the first light guide plate to sequentially increase the beam width of light emitted from the first light source by using the first input gratings and then output the light by diffracting the light in a direction toward the outside of the first light guide plate by using the first output grating.

In addition, the second backlight unit 1200 may include: a second light source that emits light having a wavelength different from the wavelength of light emitted from the first light source; and a second light guide plate. A plurality of second input gratings and a second output grating may be provided on the second light guide plate to sequentially increase the beam width of light emitted from the second light source by using the second input gratings and then output the light by diffracting the light in a direction toward the outside of the second light guide plate by using the second output grating.

Figure 17:
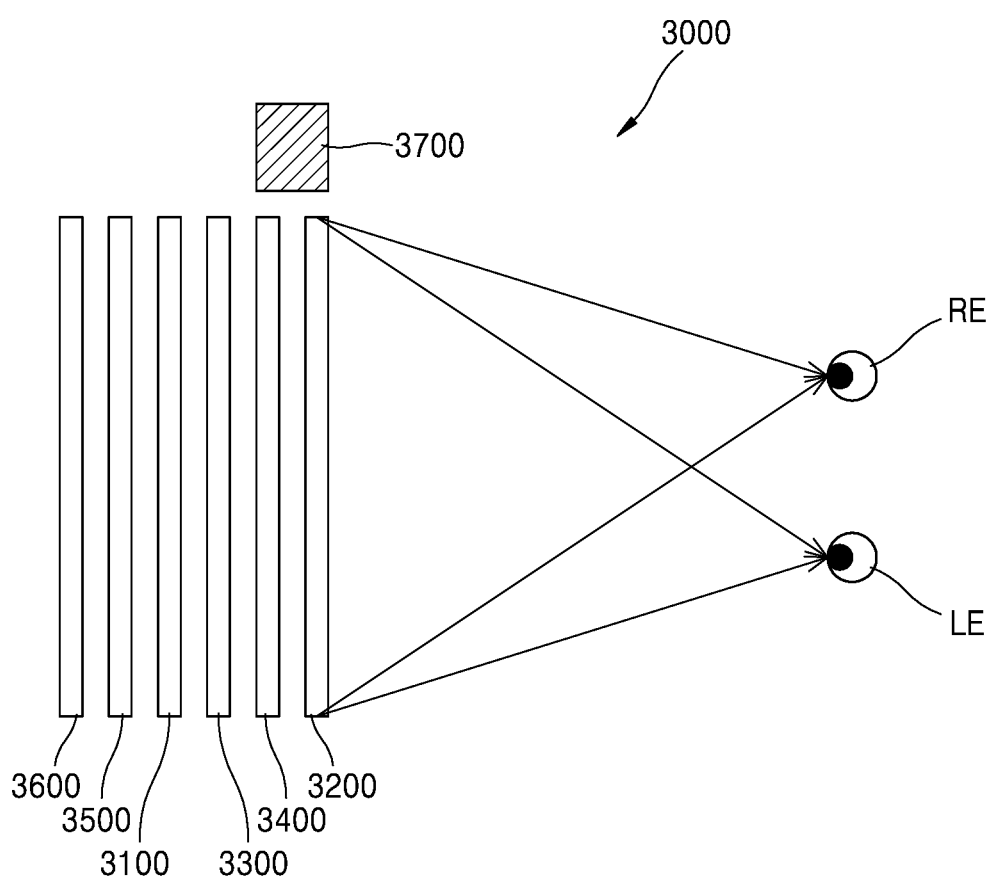
FIG. 17 is a side cross-sectional view schematically illustrating a holographic display apparatus according to an embodiment.

FIG. 17 is a side cross-sectional view schematically illustrating a holographic display apparatus 3000 according to an embodiment.

Referring to FIG. 17, the holographic display apparatus 3000 may include a backlight unit package 3100 that emits parallel light, and a spatial light modulator 3200 that forms holographic images by modulating the light emitted from the backlight unit package 3100. The backlight unit package 3100 may provide coherent light. For example, the backlight unit package 2000 described with reference to FIG. 16 may be used as the backlight unit package 3100, and thus a detailed description of the backlight unit package 3100 will not be presented here. The spatial light modulator 3200 may include a liquid crystal display (LCD) panel and a color filter. Therefore, holographic images generated by the spatial light modulator 3200 may have gradation of shading and colors.

A field lens 3400 may be further provided between the backlight unit package 3100 and the spatial light modulator 3200 to focus images generated by the spatial light modulator 3200 on a predetermined space. Although the position of the field lens 3400 is between the backlight unit package 3100 and the spatial light modulator 3200 in FIG. 16, this is a non-limiting example. For example, the field lens 3400 may be provided in front of the spatial light modulator 3200. The field lens 3400 may include a stationary lens having a constant focal length and a movable lens having adjustable focal length.

The holographic display apparatus 3000 may further include a beam deflector 3300 that two-dimensionally controls the position on which holographic images are focused. For example, the beam deflector 3300 may be implemented using a liquid crystal layer or an electrowetting device. As shown in FIG. 17, the beam deflector 3300 may be provided in front of the backlight unit package 3100. Thus, the bezel of the holographic display apparatus 3000 may be reduced.

The holographic display apparatus 3000 may further include an additional light source array 3500 in addition to the backlight unit package 3100. The light source array 3500 may include a plurality of light emitting devices that emit light diffusing in various directions instead of emitting parallel light. Light from the light source array 3500 may be used to reproduce 2D images. When the 2D images are reproduced, the backlight unit package 3100 and the beam deflector 3300 may not be operated.

The holographic display apparatus 3000 may further include an eye tracking sensor 3700 that recognize the positions of the right eye RE and the left eye LE of a viewer. A controller 3600 may be further provided to control the beam deflector 3300 according to the positions of right eye RE and the left eye LE of a viewer that are detected by the eye tracking sensor 3700. The eye tracking sensor 3700 may include an infrared camera, a visible light camera, or various sensors. In addition, the controller 3600 may also control the operations of the backlight unit package 3100 and the spatial light modulator 3200.

According to the disclosure, a plurality of diffraction gratings for generating coherent surface light are provided on a single light guide plate so that the size of a backlight unit for a holographic display may be reduced.

According to the disclosure, a backlight unit forms images for the left eye and images for the right eye by using two independent light sources, and thus a holographic display including the backlight unit may not have interference fringes.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A backlight unit comprising:
   a light source configured to provide coherent light;
   a first light guide plate comprising a light entrance surface on which the light is incident from the light source and a light exit surface through which the light is output;
   a first input grating provided on the first light guide plate and configured to diffract the light from the light source in a first direction, such that the light diffracted by the first input grating propagates in the first direction while being totally reflected in the first light guide plate;
   a first output grating provided on the first light guide plate and configured to diffract the light diffracted by the first input grating in an output direction orthogonal to the first direction, such that the light is output toward an outside of the first light guide plate;
   a second light guide plate provided on the first light guide plate, the second light guide plate comprising a light entrance surface on which the light from the first light guide plate is incident and a light exit surface through which the light propagated through the second light guide plate is output;
   a second input grating provided on the second light guide plate and configured to diffract the light from the first output grating such that the light diffracted by the second input grating propagates in a second direction orthogonal to the first direction and the output direction, such that the light propagates in the second direction different from the first direction and the output direction while being totally reflected in the second light guide plate, wherein beam width of the light propagating in the second direction increases as the light propagates in the second light guide plate in the second direction;
   a third input grating provided on the second light guide plate and configured to diffract the light diffracted by the second input grating in a third direction orthogonal to the output direction and the second direction, and parallel to the first direction, such that the light diffracted by the third input grating propagates in the third direction different from the second direction, wherein beam width of the light propagating in the third direction increases as the light propagates in the second light guide plate in the third direction; and
   a second output grating provided on the second light guide plate and configured to diffract the light diffracted by the third input grating in the output direction orthogonal to the first direction, the second direction and to the third direction, such that the light is output in the output direction toward an outside of the second light guide plate; and
   the light source comprises a first light source configured to emit first light and a second light source configured to emit second light,
   the backlight unit further comprises:
   a third light guide plate comprising a light entrance surface on which the light is incident from the second light source and a light exit surface through which the light propagating through the third light guide plate is output into the second light guide plate, the third light guide plate being provided on the light entrance surface of the second light guide plate spaced apart from the first light guide plate;

a fourth input grating provided on the third light guide plate and configured to diffract the light from the second light source such that the light diffracted by the fourth input grating propagates in a fourth direction while being totally reflected in the third light guide plate.

2. The backlight unit of claim 1, wherein
the first input grating and the first output grating are provided on the light exit surface of the first light guide plate, and
the second input grating, the third input grating, and the second output grating are provided on the light exit surface of the second light guide plate.

3. The backlight unit of claim 1, wherein
an area of the first output grating is larger than an area of the first input grating.

4. The backlight unit of claim 1, wherein
a length of the third input grating in the second direction is larger than a length of the second input grating in the second direction.

5. The backlight unit of claim 1, wherein
a length of the second output grating in the third direction is larger than a length of the third input grating in the third direction.

6. The backlight unit of claim 1, wherein
the second light emitted from the second light source has a polarization state different from a polarization state of the first light emitted from the first light source, and the backlight unit further comprises:
a third output grating provided on the third light guide plate and configured to diffract the light diffracted by the fourth input grating such that the light diffracted by the third output grating is output toward an outside of the third light guide plate; and
a fifth input grating symmetrical to the second input grating with the third input grating provided therebetween and configured to diffract the light from the third output grating such that the light propagates in a fifth direction different from the fourth direction while being totally reflected in the second light guide plate,
wherein the first light source is configured to emit the first light toward the first input grating, and the second light source is configured to emit the second light toward the fourth input grating.

7. The backlight unit of claim 6, wherein beam width of the light diffracted by the fifth input grating propagating in the fifth direction increases while propagating in the second light guide plate in the fifth direction; and
the third input grating is configured to diffract the light diffracted by the fifth input grating such that the light propagates in the second light guide plate in the third direction.

8. The backlight unit of claim 1, wherein the beam width of the light propagating in the second direction increase as the light is totally internal reflected in the second light guide plate.

* * * * *